Oct. 15, 1968
I. LITANT
3,406,126
CONDUCTIVE SYNTHETIC RESIN COMPOSITION
CONTAINING CARBON FILAMENTS
Filed Dec. 7, 1966
2 Sheets-Sheet 1
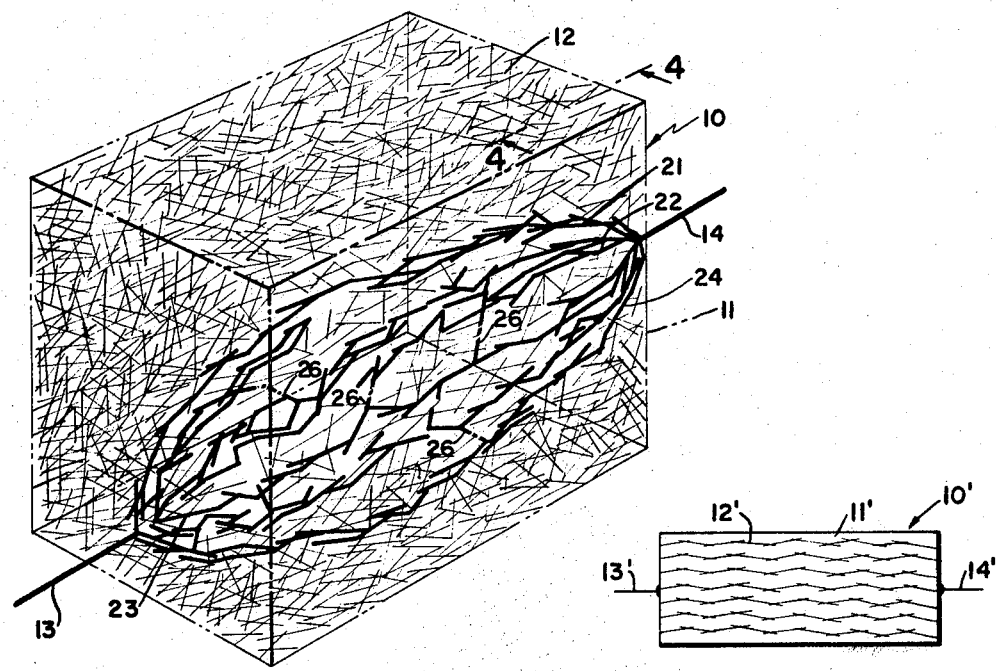
FIG.1.
FIG.2.
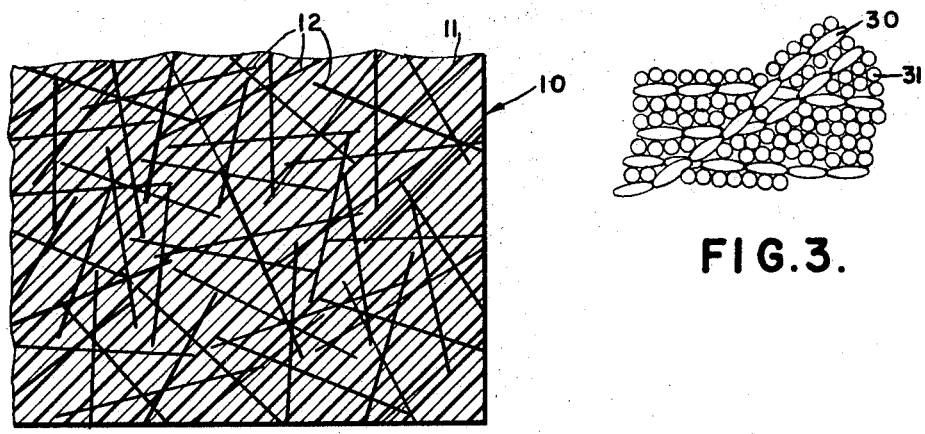
FIG.4.
FIG.3.
INVENTOR
Irving Litant
BY Alden D Redfield
Abraham Ogman
ATTORNEYS

United States Patent Office 3,406,126
Patented Oct. 15, 1968

3,406,126
CONDUCTIVE SYNTHETIC RESIN COMPOSITION CONTAINING CARBON FILAMENTS
Irving Litant, Lexington, Mass., assignor to Avco Corporation, Cincinnati, Ohio, a corporation of Delaware
Continuation-in-part of application Ser. No. 324,171, Nov. 13, 1963, which is a continuation-in-part of application Ser. No. 128,053, July 31, 1961. This application Dec. 7, 1966, Ser. No. 599,790
5 Claims. (Cl. 252—511)

ABSTRACT OF THE DISCLOSURE

An electrically conducting composite consisting of a non-conducting moldable material having imbedded therein about .05 to about 5% of unwoven carbon yarn filaments which are in substantial contacting relationship to provide a field for current flow, thus to render the moldable material conductive but without modification of or deleterious effect upon the natural and inherent qualities of such moldable material.

---

This invention relates to electrical conductors and more particularly to composite materials where electrical conductivity is obtained by incorporating a conducting material in an insulator or a non-conducting material. The result is an electrical conducting means.

This is a continuation-in-part of application for patent Ser. No. 324,171, filed Nov. 13, 1963, such latter application being in turn a continuation-in-part of application for patent Ser. No. 128,053, filed July 31, 1961.

An electrical conductor is herein defined as a material having a DC resistivity of $10^{+3}$ ohm-cm. or less at 25° C. An electrical insulator or non-conductor is defined as a material having a DC resistivity of $10^9$ ohm-cm. or higher at 25° C. (Materials having resistivities between $10^{+3}$ and $10^9$ ohm-cm. are considered semiconductors.) Such definitions represent generally accepted criteria. References to resistivity throughout this discussion shall be understood to mean "volume" resistivity, or ohms-centimeter.

The term electrical conducting means, as used herein, embraces any one of a large and varied group of composite materials comprising as a base matrix a non-conductive material, or insulator, which material is, however, loaded with an electrically conductive fiber, the peculiar nature of which is important, and such as hereinafter described.

Frequently used classes of insulators are plastics, elastomers such as rubber, ceramics, and cellulosic materials such as paper. In the prior art examples may be found where resinous or plastic materials are loaded with carbon or graphite granules in the form of either discrete particles or flakes, or metal, as steel wool, incorporated to impart primarily thermal conductivity to the base non-conductive matrix. Usually a great amount, such as 25% or more of such conducting material and taking this form, is required to produce heat conductivity of any reasonable significance to the base matrix. The patent to Myers, 2,951,817, is illustrative of such a prior art practice where approximately 50% of such materials is required to impart thermal conductivity. In such instances, however, the result of such "overloading" is to deleteriously affect the plastic or other resinous base material by drastically weakening such inherent and desirable characteristics as the mechanical properties.

One of two effects is usually observed where particle granule or flake (metallic or graphite) loading is used. Where the non-conductive material is lightly loaded with such non-linear particles, less than 10% for example, the resulting composite is an extremely poor conductor of electricity. The physical properties of the composite are thus substantially those of the non-conductive material. Furthermore, it is of essential importance that the loading with a conductive material, as in the instant invention, be at an absolute minimum for reasons briefly mentioned in the foregoing, yet that the desired result be attained: A high degree of electrical conductivity when and as desired. This is because overloading, even in amounts as low as 10%, results in a deleterious effect upon the ultimate composite. As indicated, such may take the effect of altering the physical characteristics of the base material, plastic or otherwise, rendering it less resilient or deformable, or otherwise interfering with the physical and mechanical properties which are usually inherent in base material of this resinous nature. Furthermore, granular carbon or metallic particles, of undefined and random shapes, because of the very nature and configuration of such substances, are required in undesirable large amounts before appreciable electrical conductivity is achieved.

Thus, to achieve high conductivity, even thermal, it has heretofore been necessary to heavily load a non-conductive material with conducting metallic or granule particles, to the extent of 45% by weight or higher. Such use of a large quantity of conducting particles not only undesirably alters the physical properties of the base plastic as to result in the composite exhibiting structural weaknesses, such as an excessive loss of tensile strength, but, also in addition to other undesirable effects, severe fabricating difficulties result.

The materials of the instant invention are subject to a wide and important variety of uses. When the base matrix is of plastic, and not overloaded with conducting material, as in the instant case, it is apparent that all of the desirable and inherent characteristics of such resinous materials is retained. Plastics are essentially low cost materials, easily shaped, molded or cast into intricate contours. Their high strength is conducive to many advantages over even light weight metals and their flexibility represents also an inherent advantage. With regard to all of these advantages, it is a basic concept of this invention that only a relatively minute quantity of the conductive loading material is required to obtain high electrical conductivity, and, thus, these various advantages common to any type of known plastic are retained for none of such inherent characteristics have been changed by inclusion in mere minor proportions of the fibrous, carbonized and conductive material used in the practice of this invention.

By rendering such resinous materials conductive without injury to the desirable attributes thereof, many uses may be found for the material of the invention: It is most suitable for use as conductive flooring or wall paneling where electrical heating is desired; it is ideal as a material for aircraft de-icer boots. With regard to discharging a buildup of static electricity, the material finds many adaptations in such aspects as conducting tires for wheels of vehicles in explosion hazard areas, or as equipment rollers for various types of machinery where static buildup may be a problem; and, similarly, the material is ideal for use as hosing utilized in the transfer of flammable liquids. Other applications will be readily apparent to those skilled in the art.

In the practice of the instant invention, a so-called "carbon yarn" is utilized as the current conducting filler material. Carbon yarns are generally made by the pyrolysis of textile yarns, such as rayon or orlon, in an inert atmosphere. The higher the pyrolysis temperature, the higher the carbon content of the product, and consequently the greater will be the electrical conductivity. In the case of rayon, pyrolysis over 100° C. does not increase the electrical conductivity. At about 2600° C., the carbon structure is partially converted to graphite. The following simplified grap is illustrative.

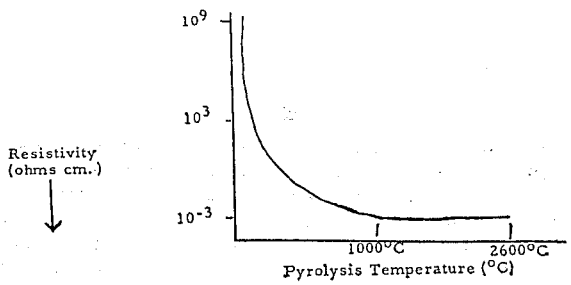

A carbon yarn may contain as many as 1400 filaments per ply, and two-ply yarns are most common. When the yarn, chopped into half-inch lengths is incorporated into a plastic matrix, even in concentrations of 1.0 percent by weight, the electrical conductivity of the composite is not changed significantly from that of the matrix plastic. If, however, the chopped yarn is so treated that the individual filaments are separated from each other, and this mass of fibers is then incorporated into a resin, it is found that even 0.05 percent of weight of the fibers in the resin has resulted in a composite having a resistance of only 11,000 ohms per square or a resistivity of $4.4 \times 10^4$ ohm-cm. In any case, the resistivity, as in the practice of this invention, will be reduced to an amount no greater than $10^5$ ohm-cm. This represents an increase in conductivity of at least 10 orders of magnitude.

It is the peculiarity of the filler conducting material which is here utilized that permits loading of the base matrix in only a very minimal amount yet with the result that the material becomes electrically conductive to a very high degree, and as just indicated, to the extent of resistance amounting to only approximately $4.4 \times 10^4$ ohms-cm. when only 0.05 percent by weight of this type of carbonized fiber or filament is incorporated in the matrix. In this regard, it is also significant to understand that these carbonized filaments are oriented in a definite fashion in the matrix, as illustrated in FIGURE 4, wherein each tiny filament may be seen to be straight or linear rather than curled or otherwise distorted. This is due to the inherent resiliency thereof, so that, when cut to the desired length before incorporation into the base material this inherent flexibility or resiliency causes each of the fibers to straighten out and take the configuration as shown in this figure. As the result one can form continuous paths more readily and with less "loading" of the base matrix, which is in particular contrast to loading of non-conductive materials such as contemplated by the prior art where the conductive elements consist of mere granules, or flakes, or metallic pieces, non of which exhibit this elongated configuration characterized by the loading agent that is here utilized.

It is thus a primary objective of this invention to provide an electrical conducting means of the type characterized as a conducting plastic which avoids the limitations and disadvantages of prior art conductors of this type. In other words, and as indicated in the foregoing, the novel concept of the instant invention is fulfilled by the use of conducting fibers of unusually small size and configuration, hereinafter referred to as carbonized fibers resulting from the treatment by carbonization of rayon or orlon yarns, or synthetics of similar characteristics, as set forth in the foregoing. With a minimum of inclusion, these components result in the desired amount of electrical conductivity, whereas in complete contradistinction, and with regard to the prior art, the inclusion of mere carbon granules, metallics as steel wool, or other metals in this same minor amount will not appreciably, if at all, lend conductivity to the base matrix. In theory, the reason for this is that the type of filament with which this invention is concerned, is one of extreme length compared to its diameter measured in terms of less than one mil, this type of fiber being of substantially straight, and non-curved configuration, and thus able to contact others which are adjacent. A conducting path is thus readily formed through the plastic or other non-conducting type of base material.

It is another object of the invention to provide a new electrical conducting means wherein filamentary conducting means is distributed through a non-conducting material, the composite material having a resistivity of less than $10^9$ ohm-cm. and physical properties substantially similar to the physical properties of the non-conducting material.

It is yet another objective of the invention to provide a new and improved conducting plastic having low resistivity and physical properties which are substantially the same as the physical properties of the plastic material.

A further object of the invention is to provide an electrical conducting means comprising a composite material formed from a non-conducting material that is loaded with straight, elongated carbonized fibers having a very great length to diameter ratio.

It is still another object of the invention to provide a conducting plastic comprising a mixture of a normally non-conducting plastic material and a certain type of plasticizer of the polar type having a resistivity of some orders of magnitude lower than the resistivity of the non-conducting material, but which increases the conductivity of the plastic mass at lower loading levels. In other words, additives of certain polar types exhibit conductive properties; these enhance conductivity at lower loadings by, in admixture with the base plastic, filling the intermolecular spaces in the latter.

It is yet another object of the invention to provide an electrical conducting means having low resistivity, said electrical conducting means being formed from a non-conducting material which has been but very lightly loaded with a filamentary material having high electrical conductivity, and comprising carbonized and single fibers or filaments of orlon, rayon, and like materials.

Another object of the invention is to provide a method of making a composite electrical conducting material by including in the base resin a plurality of a certain type of carbonized filamentary electrical conductor, the latter thus being embedded in what otherwise is an insulating material.

It is a further objective of the invention to provide a method of making a composite electrical conducting material utilizing what is here termed a "shear free" mixing process.

In accordance with this invention, the electrical conducting means comprises a base matrix of plastic or other typically electrically non-conducting material having distributed through a relatively small proportion of electrically conducting filaments. These filaments comprise carbonized fibers taking the form of elongated, carbon filaments, extremely small in diameter, and having an extremely large length to diameter ratio. The fibers are preferably uniformly distributed in a somewhat random arrangement, but even with very low percentage inclusions in the manner here contemplated, contacting adjacent fibers form an efficient electrical conductive path. They are incorporated in whatever non-conducting material may be chosen for the purpose, as plastic, before such resinous material is fabricated into the desired shape, such as by molding, extrusion or casting.

Also, in accordance with this invention, an electrical conducting means is provided which comprises a plastic, or other non-conducting base material, having an electrical conducting plasticizer distributed through the non-conducting material, this plasticizer being of a particular type, and chemically speaking, being highly polar as contrasted with non- or slightly polar chemical compounds. Its conducting abilities are resultant upon this polar characteristic.

Further, in accordance with the invention, a method is provided for forming an electrical conducting means from essentially non-conducting materials which comprise very lightly loading, by means of a shear free process, a non-conducting material with carbonized filaments distributed throughout which are in and of themselves highly conductive, then mechanically shaping the above described mixture into any desirable configuration, thereby forming an electrical conducting means.

It is a peculiarity of the procedure of this invention that the filaments are oriented throughout the base material, but each filament is so embedded as a straight or linear fiber. By this is meant the phenomena occurring through the use of the identified type of carbonized filament having that inherent quality of elasticity which, when embedded in the soft plastic, causes same to return to its natural straight line or linear configuration, thus enabling assured contact with adjacent filaments and assuring also formation of an adequate conducting path.

The novel features that are considered characteristic of the invention are set forth in the appended claims; the invention itself, however, both as to its organization and method of operation, together with additional objects and advantages thereof, will best be understood from the following description of a specific embodiment thereof when read in conjunction with the accompanying drawings, in which:

FIGURE 1 is an over-simplified perspective of a conducting plastic showing current conducting paths through a non-conducting material. The conducting paths are formed by the embedded carbonized fibers or filaments adjacent fibers being in contact;

FIGURE 2 is a section showing another construction of a conducting plastic embodying the principles of the present invention wherein the fibers are generally aligned in one direction, but not in the other, whereby the material exhibits conductivity in one direction, but not the other;

FIGURE 3 is a fragmentary view of a plastic polymer chain with a plasticizer of the polar type incorporated in the intermolecular interstices thereof, thereby increasing conductivity;

Figure 5:
Figure 6:
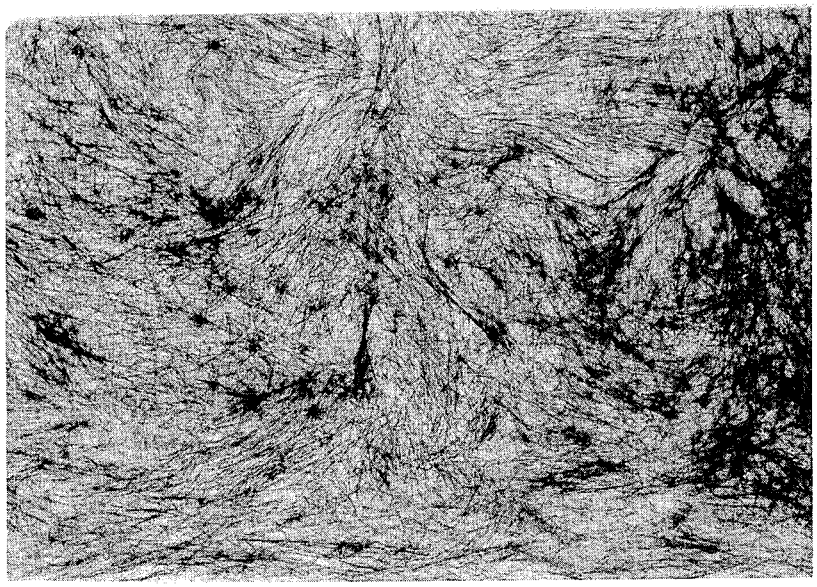

FIGURE 4 is an enlarged cross section taken on the line 4—4 of FIGURE 1, illustrating what has been referred to in the foregoing: The orientation of these carbonized filaments in "straight-line" fashion, i.e., each filament is fixedly positioned as a straight, elongated particle, as distinguished from curled or bent or distorted as would be typical of such an inclusion as steel wool, or other metallic components;

FIGURE 5 is a photomicrograph of cut yarn showing bundles of filaments described on pages 4 and 5 at ten fold magnification; and FIGURE 6 shows yarn but dispersed into individual filaments and embedded in a plastic matrix at three fold magnification as described on pages 4 and 5, and in accordance with this invention.

Referring to FIGURE 1 of the drawings there is represented therein an electrical conductor 10 comprising a block of insulating material 11, such as a plastic polyvinyl chloride or an epoxy resin for example, or ceramic. Distributed within and throughout the insulating material 11, in a random arrangement, are fibers 12 formed from an electrical conducting material, and here constituting carbonized, straight and linear conducting filaments.

A property of such carbonized filaments which makes them particularly suited for the application of this invention is the inherent quality of elastic recovery. So long as the fiber is not fractured when bent by an external force, it will tend to straighten itself. Excellent metal conductors such as copper, aluminum, and silver are extremely ductile and tend to bend permanently under a bending stress. Fibers of these ductile materials form crimped or helical structures which are not conducive to forming conducting paths.

For such reason, inclusion of such materials is undesirable: Lacking elasticity, they assume curved, spherical or other shapes, rather than a straight line configuration, with the result that a continuous, conductive path is not assured. Also, to assure such path, they must be added in high percentage amounts, as 50% or above, with the result that the inherent characteristics of the base plastic are destroyed, as hereinafter mentioned.

The electrical conductor 10 includes input and output means comprising lead wires 13 and 14 which are secured to the insulating material 11 by means of encapsulation, cement, or other suitable means.

There are shown in FIGURE 1, two apparently distinct groups of fibers. In practice, the fibers 12 are substantially uniform, although some variation in size will occur in their manufacture and handling. For example, fiber lengths may vary considerably depending on the type of material used.

It is preferred that the fibers fall within the range of ¼ to ¾ inch in length. The type of carbonized fiber here found useful is generally about 10 microns diameter, or less than about ½ mil in thickness. The length to diameter ratio of the carbonized filament is exceedingly high. For example, for a ¼ inch length of fiber the ratio will be about 640:1; for a ¾ inch length fiber, the ratio will be about 1920:1.

Percentage by weight inclusion of such carbonized fibers need not exceed 5% and may run as low as .05%. It has been determined that even with as low a percentage as .05% by weight, electrical conductivity is high, for at that percentage inclusion conductivity, measured in terms of resistance, is still 11,000 ohms per square.

An important property of any electrical conductor is its resistivity. The resistivity is a figure of merit. The quality of an electrical conductor is inversely related to the resistivity of the electrical conductor.

As is well known, the resistivity is the inverse of the conductivity of an electrical conductor. Since the factors of resistivity and resistance are the more commonly used, and, therefore more familiar, these parameters will be used in this discussion.

Referring to FIGURE 1 once again, the heavy fiber lines define four current paths 21, 22, 23 and 24, between lead wires 13 and 14. Each current path comprises a number of randomly distributed fibers. It is further assumed that these paths have been chosen at random and have no unusual characteristics. The straight fibers in the current paths 21 through 24 are in contact with each other or are separated by an extremely small gap comprising insulating material 11. The thickness of the gap contemplated is best described in terms of its electrical resistance. Where the gap length is such that the gap resistance is less than or the same order of magnitude as the resistance of the fibers, the gap becomes part of the resistance path and acts, in most respects, like the conducting fibers themselves.

It is noted that the total resistance between the lead wires 13 and 14 along any one of the paths 21 through 24 is the sum of the resistance of the fibers which make up the resistance path plus the resistance of length of plastic situated between adjacent fibers.

It is also quite obvious from FIGURE 1 that the resistance paths 21 through 24, with respect to the lead wires 13 and 14, represent parallel paths. While only four paths have been illustrated, it is clear that there are a great many within the body of the electrical conductor 10 since there are sufficient carbonized filaments within the electrical conductor 10 to assure a large number of contacts between adjacent fibers, especially when one considers the straight, linear configuration of such fibers.

Thus, the total resistance between the lead wires 13 and 14 is covered by the well-known relationship:

$$\frac{1}{R_T} = \frac{1}{R_1} + \frac{1}{R_2} + \frac{1}{R_3} \cdots \frac{1}{R_n} = \sum_{R=1}^{R\infty} \frac{1}{R} \quad (1)$$

where $R_1$, $R_2$, etc. is the resistance of a path. Thus, if we have $n$ identical paths each having a value of $R_1$, the total resistance $R_T$ is equal to $R_1/n$. Although $R_1$ and $n$ can be very large, their quotient may be very small, even less than one.

The foregoing can be simply illustrated by means of a hypothetical situation based on the following assumptions:

(1) Fiber length 1 cm.
(2) The distance between electrical conductors 13 and 14 is 1 cm.
(3) Fiber diameter 10 microns.
(4) Fiber material carbonized filament. Applying the well-known equation:

$$R = \rho l/a$$

the resistance of each fiber, for $\rho = 1000 \times 10^{-6}$ ohm-centimeters, is equal to 1,000 ohms.

(5) Fiber to fiber contact.

Even under conditions of random distributions of these straight fibers, it is reasonable to assume that a conducting path of 1 cm. in length comprises ten such fibers. Therefore, the assumed resistance of a path 21 through 24 is 10,000 ohms.

A realistic number of parallel paths for an electrical conductor having the dimensions noted above will be in the order of a thousand. Thus, the total resistance between the lead wires 13 and 14 for this hypothetical condition will be ten ohms.

As a practical matter, the means by which electrical current will travel between the lead wires 13 and 14 comprises an extremely complex path of least resistance. It will by no means resemble the simplified construction described above. In all probability, judging from the observed results, it will comprise a larger number of series parallel combinations than illustrated due to the random orientation of conducting fibers. For example, it is reasonable to assume that filaments such as 26 in FIGURE 1, shown as a heavy dashed line, interconnect the resistance paths 21–24 intermediate the lead wires 13 and 14.

The above discussion is intended merely to illustrate in a general way a mechanism by which a known non-conducting body such as the insulating material 11 can be transformed into a conducting medium by lightly loading the insulating material 11 with conducting fibers of the particular type utilized in this invention.

By way of illustration and not by limitation, the following electrical conductors have been fabricated and tested. In all the examples below, fibers averaging 10 microns in diameter and 3 millimeters in length were used. The fibers used were shorter than is considered optimum for developing a very low resistance conducting plastic for the fiber loadings specified.

Example 1

| | |
|---|---|
| Polyester resin parts by weight | 93.0 |
| Benzoyl peroxide paste do | 2.0 |
| Carbonized fibers do | 5.0 |
| Resistivity ohm-cm | 2.4 |

Example 2

| | |
|---|---|
| Epoxy resin parts by weight | 98 |
| Carbonized fibers do | 2 |
| Resistivity ohm-cm | 25.9 |

Example 3

| | |
|---|---|
| Polyvinyl chloride resin parts by weight | 97.5 |
| Carbonized fibers do | 2.5 |
| Resistivity ohm-cm | 51.1 |

To this point, a random distribution of fibers was assumed. In many applications it may be desirable to fabricate an electrical conductor embodying the principles of the present invention which has low resistivity (a high conductivity) in a specific direction while maintaining the insulation property of the non-conducting material in another direction. In this connection, attention is directed to FIGURE 2 which shows a cross section of a conducting plastic 10' in which fibers 12' are incorporated in the insulating material 11' in an oriented fashion, more specifically, in a substantially parallel relationship. Here, viewing this figure, the primary current flow will be in a horizontal direction with little or no current flow in a vertical direction. Under these conditions the resistance between conductors 13' and 14' will be substantially lower than the resistance in a transverse direction.

The distribution of fibers shown in FIGURES 1 and 2 represents two extremes. A novel result arising from the incorporation of fibers in a non-conducting material to form an electrical conductor is that the character of the electrical conductor 10 can be made to any desired characteristic by varying the orientation of the fibers and their quantity. An illustration would be a number of separate and distinct electrical conductors in a single physical block where each of the conductors is separated by a substantial layer of insulating material.

It will also be noted that the percentages of conducting material in proportion to the quantity of insulating material is extremely small due to the use of fiber conductors incorporated in the insulating material. The physical properties of the insulating material are thus not impaired to any measurable extent. A typical construction is an electrical conductor in the form of a ribbon. If the insulating material is inherently flexible, the ribbon will exhibit flexible properties. Additionally, if the insulating material resists attack by chemical action, the conducting element fabricated therefrom will resist chemical attack.

The foregoing discussion was directed to loading non-conducting materials with electrical conducting filaments, such as carbonized fibers. Also, the conductivity of the plastic may be enhanced by including a plasticizer which is a poor insulator—a better conductor—than the non-conducting material. Many plasticizers have a high polar moment, and thus, generally contain impurities such as dissolved inorganic materials. Many of these impurities are electric conductors and when incorporated in the plasticizer they lower resistivity.

Such a plasticizer distributes itself between the plastic polymer chains. Again, referring to FIGURE 3 of the drawings, a random arrangement of polymer chains 30 is depicted in a fragmentary representation.

The numbers 31 represent molecules of a plasticizer. While not apparent from FIGURE 3, the polymer chains 30 are not in contact but are spaced, on a sub-microscopic scale. When the space separating the polymer chains 30 are filled with a plasticizer 31, there are created a large number of electrically interconnected series of parallel conductors.

Where the matrix contains less than 1% of the described carbonized filaments, then anywhere from about 10% to about 25% of an organic polar plasticizer is included in the base material. Such, depending upon the particular materials used as the matrix, will further lower the resistivity of the base non-conducting material at least as much as 20% to as much as 500%.

The following examples illustrate that the resistivity of non-conducting materials can be further reduced by several orders of magnitude by the incorporation of a suitable plasticizer of the polar type:

Example 4

| | |
|---|---|
| Epoxy resin parts by weight | 89.0 |
| Orthonitroanisole do | 9.0 |
| Carbonized fibers do | 2.0 |
| Resistivity ohm-cm | 10.4 |

The foregoing Example 4 should be compared with Example 2, since in each instance a 2% inclusion of the carbonized fibers is utilized, Example 2 not including the use of the polar plasticizing and Example 4 exhibiting incorporation of orthonitroanisole to the extent of nine parts by weight. In that Example 2 results in resistivity of 25.9 ohm-cm. and Example 4 results in 10.4 ohm-cm. resistivity, it is clear that the conductance, as per Example 4, has been increased approximately two and one half times. This, of course, is due to the conductive nature of the identified polar compound and its presence, in the intermolecular spacings of the non-conductive epoxy resin.

The following example is further illustrative of the determined fact that in instances of extremely small loading with the carbonized filaments, as a loading of .05% by weight, the effect of inclusion of orthonitroanisole or other known organic polar compounds, is even greater.

Example 5

| | | |
|---|---|---|
| Epoxy resin | grams | 79.5 |
| Orthonitroanisole | do | 20.0 |
| Carbonized fibers | do | 0.5 |
| Resistivity | ohm-cm | 129.9 |

Example 6

| | | |
|---|---|---|
| Epoxy resin | grams | 99.5 |
| Carbonized fibers | do | 0.5 |
| Resistivity | ohm-cm | 518.4 |

As shown in the last examples, 5 and 6, the loading is only 0.5% yet the reduction in resistivity due to the addition of the named polar compound is 389 ohm-cm., indicating a four fold increased conductivity over that obtained in Example 6.

When a polar material is added to a non-conductor a plastic for example, having a resistivity of $10^{+15}$ ohm-cm. in the proportion of 20% polar material, by weight, the composite resistivity is about $10^7$. This indicates that the polar material has a resistivity of at least $10^7$. Therefore, one would expect to find that a polar material would not reduce the resistivity of a material having a resistivity of several hundred ohm-cm.

Examples 5 and 6 demonstrate that the unexpected occurs. These examples also indicate that the combination produces a synergistic effect.

In general, the percentage by weight of the included polar compound will be from about 1% to about 20%, with consequent further reduction in resistivity of at least 20%.

As contemplated by this invention, the light filament loading (here between the range of .05% to 5% by weight) will vary with the type of filaments used, the resistivity of the filaments, the presence or absence of a semi-conductive plasticizer, and the size and distribution of the carbonized filaments used which result from the mixing process. However, with a known starting fiber length and with a specific mixing process, electrical and physical properties were found to be reproducible and reliably so. The desired amount of loading must therefore, of necessity, be defined in physical and electrical terms with adequate consideration being given to the objectives of the invention, viz, to provide an electrical conducting means characterized by a resistivity materially less than the resistivity of the matrix material and having physical properties such as flexibility, texture, strength and color substantially similar physical properties of the matrix material, all due to the novel concept of this invention that high conductivity can be imparted to insulating materials by use of only minimal quantities of an incorporated and appropriate conductive filament. In short, the electrical conducting means should have physical properties similar to those of the matrix material so that the electrical conducting means can be used in applications where the matrix material alone is used. An example of this is the use of filaments in polyvinyl chloride for providing an electrically conducting floor tile.

Another important consideration in fabricating electrical conducting materials of the type being discussed relates to the method of incorporating the fibers in the matrix materials. Experience has demonstrated that machinery and techniques commonly used to mix paints and plastic ingredients have a deleterious effect on the fibers and do not result in a suitable electrical conducting medium. The machinery alluded to above is of the type characterized as imparting a high shear stress on the materials being mixed. In the process of using the high shear apparatus to thoroughly mix the plastic ingredients, the fibers, particularly the graphite fibers, are materially reduced in length. Typical of high shear machinery are the following: rubber mill, three roll paint mill, and a calendering mixer.

Accordingly, in accordance with this invention, the fibers are mixed with the matrix materials in mixing machines which impart little or no shear stress. Typical of these kinds of machinery are the following: pebble mill and hand or mechanical stirring, the latter preferably of the low velocity type.

A simple low-speed rotating blade having relatively dull edges was found to be highly suitable in liquid systems. Where it is desired to mix the carbonized fibers with a powdered matrix material such as polyvinyl chloride, a pebble mill may be used.

It is the peculiar attribute of these carbonized fibers which exhibit a straight line or linear configuration that permits attainment of a very high degree of electrical conductivity in a normally insulative material with only a percentage by weight inclusion which preferably does not exceed 5% and which in many instances need only be of the order of .05%. This extremely low amount of the conducting material results in the greatest practical advantage—that whatever non-conductor matrix be used, resin, porcelain, or otherwise, the physical nature thereof is not substantially affected so that, particularly in the case of plastic base materials, the same, when rendered conductive by this treatment, being still adaptable to any and all of the uses and methods of manufacture heretofore known to the art.

As mentioned in the foregoing, it has been found that certain highly polar compounds, when added to the carbon filler—plastic composite, for example at a 0.05% level, will enhance the electrical conductivity of the composite. This enhancement is observed only at the lower loadings of carbon fibers. One such polar organic compound is orthonitroanisole. The following graph is illustrative:

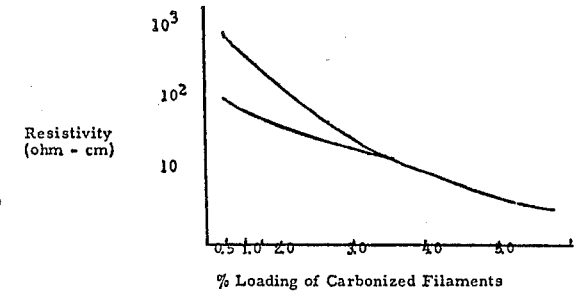

% Loading of Carbonized Filaments

This incorporation of such component, as heretobefore mentioned, is shown in FIGURE 3. It is, of course, to be understood that this addition of the specifically mentioned orthonitroanisole is to enhance or multiply the effect of the desired amount of carbonized filaments introduced into a given non-conducting base matrix at the lower percentages by weight (i.e., .05% to 2%).

Although, as heretofore emphasized, a non-conducting material can be rendered highly conductive with regard to electrical conductivity by inclusion of only 5% or less of the carbonized fibers, the thermal conductivity of such a matrix is not substantially increased. Actual tests were made of a polyvinyl chloride resinous base material containing the maximum of 5% carbonized filaments. This test piece was square, having a thickness of .498 inch and a weight of 151.2 grams. At a temperature of 250° F. the $k$ or thermal conductivity was measured to be 0.135, which represents but an insignificant increase in thermal conductivity over that of the same resinous base material not containing any carbonized and electrically conducting fibers. The measure of conductivity, or $k$ of 0.139 represents, of course, a measurement of B.t.u.'s per hour, per feet squared, per degree Fahrenheit per foot.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:
1. A non-conductor material having a DC resistivity in excess of $10^9$ ohm-cm. at 25° C. and consisting essentially of a moldable synthetic resin composite, means in said composite rendering said material electrically conductive, said means comprising individual, separate carbon yarn filaments of straight, linear configuration and distributed at random throughout said composite, a substantial proportion of said filaments being in contacting relationship, said filaments being present in said matrix in an amount of about .05% to 5% by weight, said filaments having a high length to diameter ratio and being from about ¼ inch to ¾ inch in length and less than one mil in diameter, and being sufficiently elastic to return to straight, linear configuration when distorted, whereby said moldable composite is rendered electrically conductive in any direction to the extent of resistivity no greater than about $10^5$ ohm-cm.

2. The composition as defined in claim 1 wherein said composite contains less than 1% of said filaments and from about 10% to about 20% of an organic polar plasticizer disposed intermolecularly in said material whereby said resistivity of said matrix is decreased at least 20% from the resistivity of said filament containing matrix not containing said polar compound.

3. The composition as defined in claim 2 wherein said polar plasticizer is orthonitroanisole.

4. The composition as defined in claim 1 wherein said filaments are the carbonized product of a synthetic resin which has been subjected to pyrolysis at a temperature of from about 1000° C. to 2600° C.

5. The composition as defined in claim 1 wherein said length to diameter ratio of said filaments is from about 640:1 to about 1920:1.

References Cited
UNITED STATES PATENTS

| | | | |
|---|---|---|---|
| 2,796,331 | 6/1957 | Kanffman et al. | 252—502 |
| 3,011,981 | 12/1961 | Soltes | 252—502 |
| 2,901,455 | 8/1959 | Jurras | 260—40 |
| 2,951,817 | 9/1960 | Myers | 252—511 |
| 2,956,039 | 10/1960 | Novak et al. | 260—40 |
| 2,293,839 | 8/1942 | Linder | 343—18 |
| 3,265,557 | 8/1966 | DeFries et al. | 162—138 |

OTHER REFERENCES

Chemical and Engineering News, volume 37, page 56, Nov. 30, 1959.

LEON D. ROSDOL, *Primary Examiner.*

J. D. WELSH, *Assistant Examiner.*